United States Patent [19]

Ruf et al.

[11] Patent Number: 5,069,176

[45] Date of Patent: Dec. 3, 1991

[54] INTERNAL COMBUSTION ENGINE

[75] Inventors: Max Ruf, Obereisesheim; Erwin Korostenski, Oedheim, both of Fed. Rep. of Germany

[73] Assignee: Audi AG, Ingolstadt, Fed. Rep. of Germany

[21] Appl. No.: 436,099

[22] Filed: Nov. 13, 1989

Related U.S. Application Data

[63] Continuation of Ser. No. 43,932, Apr. 29, 1987, abandoned.

[30] Foreign Application Priority Data

May 16, 1986 [DE] Fed. Rep. of Germany ....... 3616629

[51] Int. Cl.⁵ .............................................. F02F 1/24
[52] U.S. Cl. ........................... 123/193 H; 123/193 CH
[58] Field of Search ........ 123/193 R, 193 H, 193 CH, 123/195 R, 195 H, 195 C, 90, 38

[56] References Cited

U.S. PATENT DOCUMENTS 3,103,921  9/1963  Seifert et al. .................. 123/193 H
3,200,804  8/1965  Hensler et al. ................ 123/193 H
4,497,289  2/1985  Bortolussi .................... 123/193 H

FOREIGN PATENT DOCUMENTS 795981   8/1937  France ..................... 123/193 CH
1078588 11/1954  France ..................... 123/193 CH Primary Examiner—Andrew M. Dolinar
Assistant Examiner—M. Macy
Attorney, Agent, or Firm—Kane, Dalsimer, Sullivan, Kurucz, Levy, Eisele and Richard

[57] ABSTRACT

In an internal-combustion engine, the light-metal cylinder head 1 is bolted together with the cylinder crankcase 2 by means of bolts 9, which extend in each case through a bore hole 10 in the cylinder head 1 and are bolted into a threaded borehole 11 in the cylinder crankcase 2. In order to keep the surface pressure, when the cylinder head bolts are tightened, at a level permissible for the light-metal alloy of the cylinder head 1 without using shims that require much space, a threaded sleeve 15 of steel, on the face 17 of which the head of the cylinder head bolt 9 is lying, is screwed into the borehole 10. The bearing surface for the force of the bolt is formed by the areas of the edges of the thread of the threaded sleeve 15. Accordingly, a sufficient area can be made available by an appropriate number of threads without the need to have the external diameter of the threaded sleeve 15 larger than the external diameter of the bolt head 12, 13.

9 Claims, 2 Drawing Sheets

INTERNAL COMBUSTION ENGINE

This is a continuation of copending application Ser. No. 043,932 filed on Apr. 29, 1987, now abandoned.

In the known internal-combustion engines of this type, the cylinder head is fastened to the cylinder crankcase either by hexagonal head bolts or by studs screwed into the cylinder crankcase, the bolt heads or nuts lying by way of shims against an end face of the cylinder head. The dimensions of the shims must be so selected, that the permissible surface pressure, which amounts to about 150 N/mm$^2$ for the usual light-metal alloys, is not exceeded. Moreover, the external diameter of the shim must be appreciably larger than the external diameter of the bolt head or of the nut. However, because of the cramped space conditions, such shims cannot be accommodated, especially not in cylinder heads with more than two valves per cylinder. In order to provide a remedy here, it is known (German Auslegeschrift 2,733,445) that the shims may be constructed asymmetrically, for example, in the shape of a circular ring with a segment-like flattened side, and that the turning of the shim while the cylinder head bolt is being screwed in or the nut is being screwed on may be prevented by a rib, which is provided at the underside of the shim and can be pressed into the softer material of the cylinder head. With this, however, only a displacement of the bearing surface can be achieved, the size of which is determined by the permissible surface pressure and remains unchanged. In some cases, however, this large bearing surface cannot be realized.

It is an object of the invention to provide an internal-combustion engine of the type indicated in the introductory part of claim 1, for which a sufficient bearing surface is achieved so that the light-metal cylinder head can safely absorb the forces of the screws even if the space conditions are exceptionally cramped.

This objective is accomplished pursuant to the invention by the features given in the characterizing portion of claim 1.

For the inventive proposal, the bearing surface for the force of the screws is determined by the edges of the thread of the threaded sleeve and a sufficient area for absorbing the force of the screws can thus be made available by the appropriate choice of the number of threads, so as to keep the surface pressure within the permissible limits, without the space required for this having to be larger than the space required for the head or the nut of the cylinder head bolt.

Preferably, the thread of the threaded sleeve runs in a different direction to the thread of the cylinder head bolt, that is, it is a left-handed thread when the thread of the cylinder head bolt is a right-handed thread, as it usually is. Such a procedure prevents the threaded sleeve being carried along and additionally screwed in when the cylinder head bolt is being tightened. Instead, the threaded sleeve is braced in the internal screw thread of the borehole. This bracing can even be reinforced if the outer face of the threaded sleeve has the shape of a hollow cone and the face of the head or the nut of the cylinder head bolt, which works together therewith, has a complementary shape. Through this shaping, the threaded sleeve is extended. At the same time, a deformation of the threaded sleeve in the direction of the bolt shank is prevented.

Finally, a shoulder, against which the inner face of the threaded sleeve lies in the screwed-in state, may be provided. A disk of a material, which is harder than the material of the cylinder head, may be placed on this shoulder to prevent deformation of this shoulder while the threaded sleeve is being screwed in.

An example of the operation of the invention is described in the following with reference to the drawings.

Figure 1:
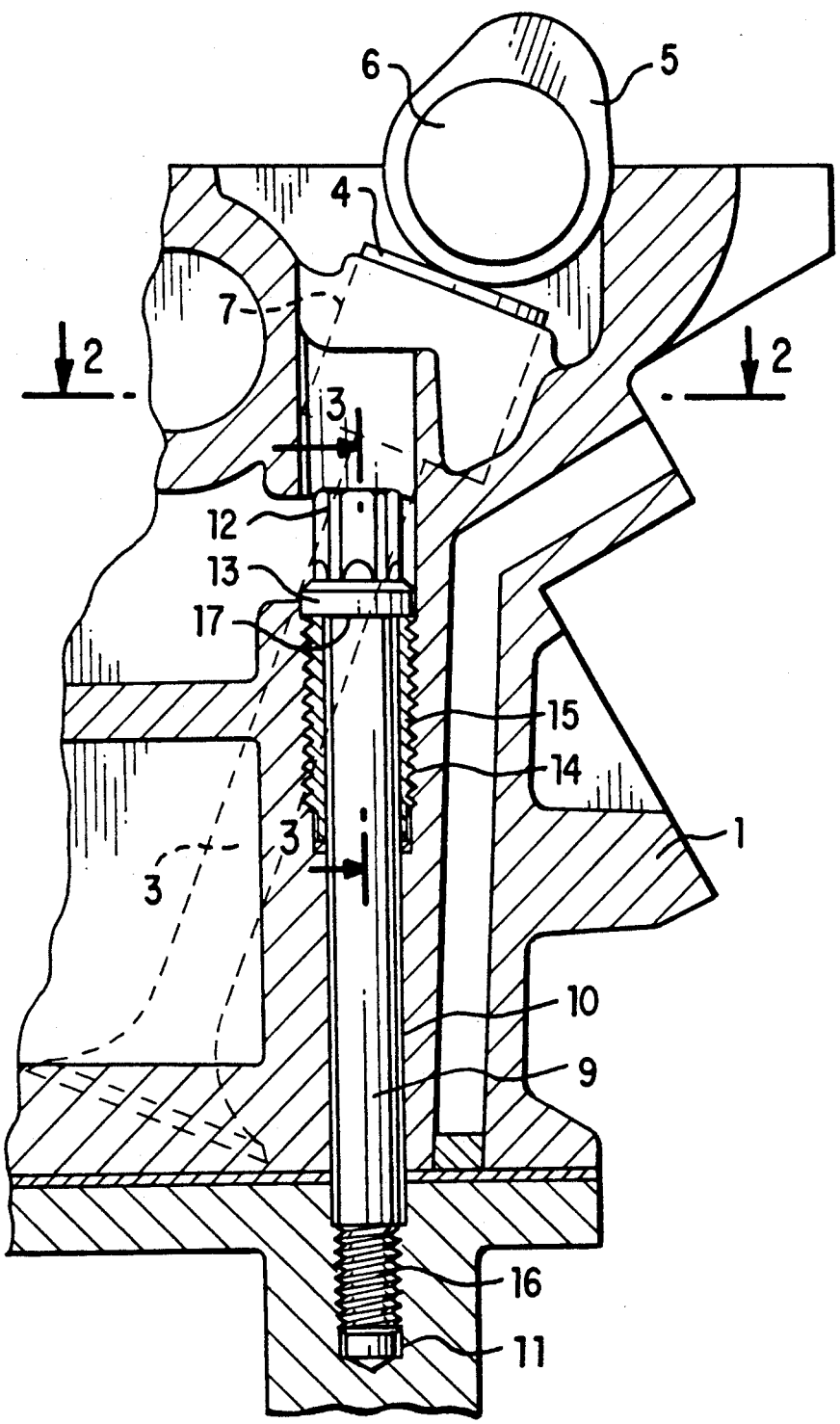
FIG. 1 shows a partial section of a cylinder head and the adjacent region of a cylinder crankcase.
Figure 2:
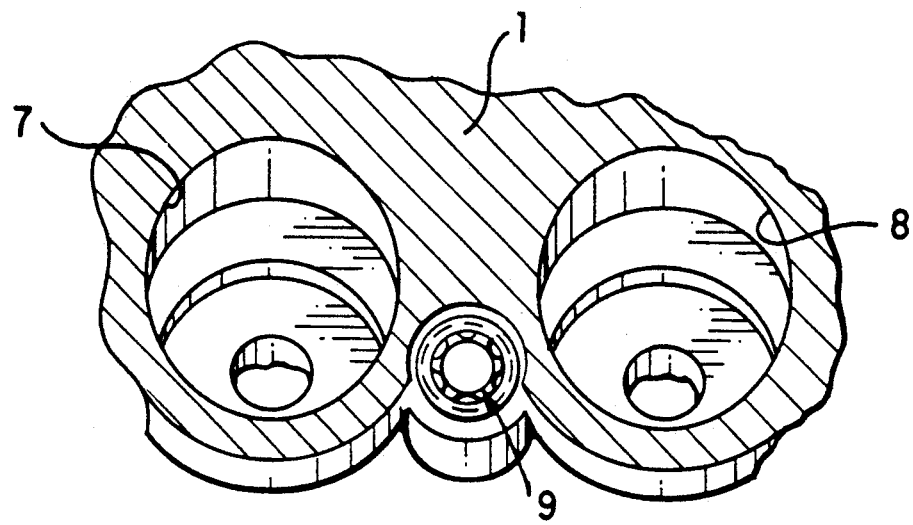
FIG. 2 shows a section of the cylinder head along the line 2—2 in FIG. 1.

In FIG. 1, a light-metal cylinder head of an internal-combustion engine is labelled 1 and a cylinder crankcase is labelled 2. In the example of the operation shown, the cylinder head 1 has two inlet valves and two outlet valves for each cylinder. Of these valves, only one inlet valve 3 is shown, which has a cup tappet 4, which is activated by a cam 5 of an overhead cam shaft 6. In FIG. 2, the boreholes 7 and 8 for the cup tappets of the two inlet valves are shown. The cylinder head 1 is bolted together with the cylinder crankcase 2 by means of cylinder head bolts 9, of which only one is shown. To accommodate that bolt 9, a borehole 10 is provided in the cylinder head 1 and a threaded borehole 11 in the cylinder crankcase. The bolt 9 has a polygonal head 12 and a collar 13. The borehole 10 in the cylinder head 1 is provided with a thread 14, into which a threaded sleeve 15 of steel is screwed. The thread 14 and the outer thread of the sleeve 15 that works together with it run in the opposite direction to the direction of the thread 16 of the bolt 9 and the thread of the threaded borehole 11 working together with it. If the thread 16, as is customary, is right-handed, then the thread 14 is left handed. The outer face 17 of the threaded sleeve 15 forms the bearing surface for the collar 13 of the cylinder head bolt 9. The inner face 18 of the threaded sleeve 15 lies over a shim 19 against a shoulder 20, which is provided in the borehole 10. Recesses 21 at the lower end of the threaded sleeve 15 are provided so that the threaded sleeve 15 may be engaged by a tool for the purpose of screwing it in.

Figure 3:
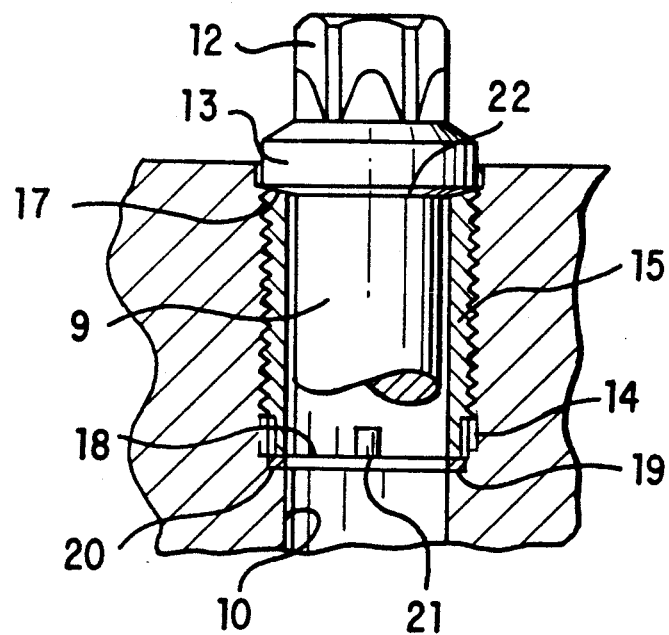
FIG. 3 shows a partial section along the line 3—3 in FIG. 1 on a larger scale.

As can be seen from FIG. 2, there is only very little space between the boreholes 7 and 8 for adjacent cup tappets to accommodate a cylinder head bolt. This space is in no way adequate to provide between the head of the cylinder head bolt or, if a stud is used, between the nut and the bearing surface of the cylinder head a shim of such a size, that the permissible surface pressure is not exceeded when the not or bolt are tightened. In the example of the operation shown, the bearing surface for the fore of the bolt is determined by the edges of the thread of the threaded sleeve 15. Accordingly, by appropriately selecting the number of threads, a sufficient area can be created to absorb the force of the bolts so as to keep the surface pressure within the permissible limits, without requiring more space for this than is required for the collar 13 of the cylinder head bolt 9. This is clearly evident from FIG. 3.

Because of the fact that the thread of the threaded sleeve 15 runs in a different direction than the thread of the cylinder head bolt 9, the threaded sleeve 15 is not carried along and additionally screwed in when the cylinder head bolt is tightened. Rather, the threads of the threaded sleeve 15 are braced with the threads of the internal thread 14, so that, because of the relatively soft material of the cylinder head 1, it comes about that all threads carry the load and that a larger bearing surface for the force of the bolts is thus achieved. This bracing can be reinforced even more by having, as can be seen from FIG. 3, the outer face 17 of the threaded sleeve 15 in the shape of a flat hollow cone and providing the face 22 of the collar 13 of the cylinder head bolt 9 that works together with the outer face with a complementary shape. On tightening the cylinder head bolt 9, an extension of the threaded sleeve 15 at its outer ends is achieved because of the interacting angular faces 17 and 22. In addition, the threaded sleeve 15 can also be secured against twisting in the usual manner by a curable synthetic resin.

The invention is not limited to the example of the operation described. For example, instead of the bolt 9 with a polygonal head 12 and a collar is also possible to use a stud with nut, although such a nut usually requires more space.

We claim:

1. Internal-combustion engine with a cylinder crankcase (2) and a light-metal cylinder head (1), which is connected with the cylinder crankcase by bolts (9) having a thread 16, which extend in each case through a borehole (19) in the cylinder head and are bolted into a threaded borehole (11) in the cylinder crankcase and have heads (12) which act together positively with the cylinder head, wherein the borehole (10) in the cylinder head (1) has a thread, into which a threaded sleeve (15) of a material that is harder than the cylinder head is screwed, the threaded sleeve (15) having a thread in a direction opposite to the thread (16) of the cylinder bolt head (9), said threaded sleeve (15) having an outer face (17) forming the bearing surface for the head (12) of the cylinder head bolt (9), and said threaded sleeve (15) has an external diameter which corresponds essentially to the external diameter of the head (12) of the cylinder head bolt (9).

2. Internal-combustion engine as defined in claim 1, wherein the outer face (17) of the threaded sleeve (15) has the shape of a flat hollow cone and the head (12) of the cylinder head bolt (9) has a face (22) which works together with and has a shape complementary to that of the outer face (17).

3. Internal-combustion engine as defined in claim 1 wherein the threaded sleeve (15) has an external diameter which corresponds essentially to the external diameter of the head (12) of the cylinder head bolt (9).

4. Internal-combustion engine as defined in claim 1, wherein the outer face (17) of the threaded sleeve (15) has the shape of a flat hollow cone and the head (12) of the cylinder head bolt (9) has a face (22) which works together with and has a shape complementary to that of the outer face (17).

5. Internal-combustion engine as defined in claim 1, wherein the outer face (17) of the threaded sleeve (15) has the shape of a flat hollow cone and the head (12) of the cylinder head bolt (9) has a face (22) which works together with and has a shape complementary to that of the outer face (17).

6. Internal-combustion engine as defined in claim 3, wherein the outer face (17) of the threaded sleeve (15) has the shape of a flat hollow cone and the head (12) of the cylinder head bolt (9) has a face (22) which works together with and has a shape complementary to that of the outer face (17).

7. Internal-combustion engine as defined in claims 1, 2, 3, 4, 5, or 6, wherein the borehole (10) of the cylinder head (1) is provided with a shoulder (20), against which an inner face (18) of the threaded sleeve (15) lies in a screwed-in state.

8. Internal-combustion engine as defined in claim 7, wherein a washer (19) of a material harder than the material of the cylinder head (1) is placed on the shoulder (20).

9. The internal-combustion engine as claimed in claim 1 wherein the bolts (9) are in the form of rods upon which nuts are screwed, said nuts contacting the threaded sleeve (15).

* * * * *